United States Patent [19]

Tada

[11] Patent Number: 5,601,505
[45] Date of Patent: Feb. 11, 1997

[54] HYDRAULIC TENSIONER

[75] Inventor: Naosumi Tada, Nabari, Japan

[73] Assignee: Borg-Warner Automotive, K.K., Nabari, Japan

[21] Appl. No.: 524,205

[22] Filed: Sep. 8, 1995

[30] Foreign Application Priority Data

| Sep. 12, 1994 | [JP] | Japan | 6-244594 |
| Oct. 21, 1994 | [JP] | Japan | 6-283000 |
| Dec. 28, 1994 | [JP] | Japan | 6-338851 |
| Mar. 8, 1995 | [JP] | Japan | 7-78303 |
| Mar. 8, 1995 | [JP] | Japan | 7-78304 |

[51] Int. Cl.$^6$ ............................. F16H 7/08
[52] U.S. Cl. ............................. 474/110
[58] Field of Search ............................. 474/101, 110, 474/111, 136, 138

[56] References Cited

U.S. PATENT DOCUMENTS

| 3,802,286 | 4/1974 | Winklhofer et al. | 74/242.119 |
| 4,504,251 | 3/1985 | Mittermeier | 474/110 |
| 4,504,252 | 3/1985 | Honma | 474/112 |
| 4,507,103 | 3/1985 | Mittermeier | 474/110 |
| 4,713,043 | 12/1987 | Biedermann | 474/111 |
| 4,726,801 | 2/1988 | Stark | 474/101 |
| 4,728,317 | 3/1988 | Martz et al. | 474/110 |
| 4,826,470 | 5/1989 | Breon et al. | 474/110 |
| 4,874,352 | 10/1989 | Suzuki | 474/110 |
| 4,881,927 | 11/1989 | Suzuki | 474/110 |
| 4,909,777 | 3/1990 | Inoue et al. | 474/110 |
| 4,981,460 | 1/1991 | Ojima | 474/111 |
| 5,116,284 | 5/1992 | Cho | 474/110 |
| 5,167,402 | 12/1992 | Nakakubo et al. | 474/110 X |
| 5,193,498 | 3/1993 | Futami | 474/110 X |
| 5,314,388 | 5/1994 | Suzuki et al. | 474/110 |
| 5,346,436 | 9/1994 | Hunter et al. | 474/110 |
| 5,352,159 | 10/1994 | Suzuki et al. | 474/110 |
| 5,366,415 | 11/1994 | Church et al. | 474/110 |
| 5,370,584 | 12/1994 | Todd | 474/110 |

FOREIGN PATENT DOCUMENTS

| 46-28575 | 8/1971 | Japan . |
| 58-38189 | 8/1983 | Japan . |
| 60-30507 | 9/1985 | Japan . |
| 60-39559 | 11/1985 | Japan . |
| 1-115075 | 8/1989 | Japan . |
| 2-34508 | 9/1990 | Japan . |
| 3-20750 | 2/1991 | Japan . |
| 3-35355 | 4/1991 | Japan . |
| 4-95176 | 8/1992 | Japan . |
| 6-1890 | 1/1994 | Japan . |
| 6-45141 | 6/1994 | Japan . |

*Primary Examiner*—Roger J. Schoeppel
*Attorney, Agent, or Firm*—Willian Brinks Hofer Gilson & Lione; Greg Dziegielewski

[57] ABSTRACT

A hydraulic tensioner having a sleeve located in the opening in the tensioner body and a pin to slide within the sleeve to retain the tensioner plunger in a retracted position. In another embodiment, the tensioner includes a support member located around the periphery of the plunger to support a coil spring to bias the plunger in the protruding direction. A male thread formed on the outer surface of the support member engages a female thread formed in the tensioner opening. In another embodiment, the tensioner includes a stopper pin and spring-loaded hook member that retains the plunger in a retracted position. In another embodiment, a check valve located to permit fluid flow into the plunger chamber has a retainer with several extending legs.

11 Claims, 9 Drawing Sheets

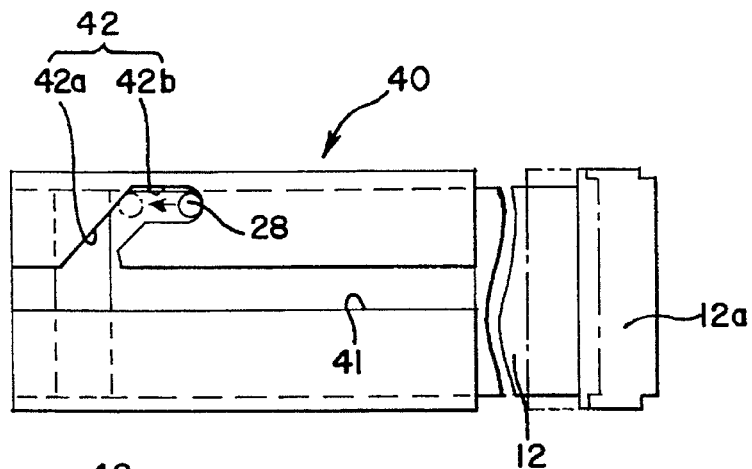
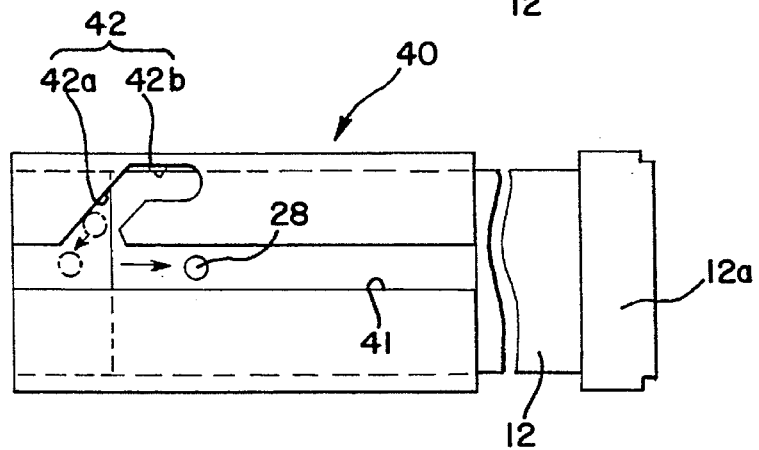
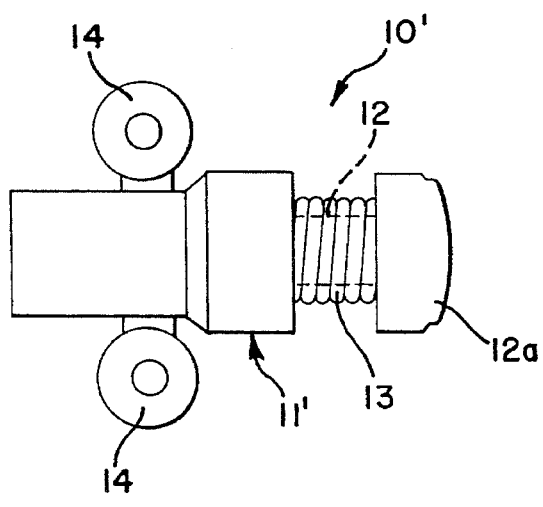
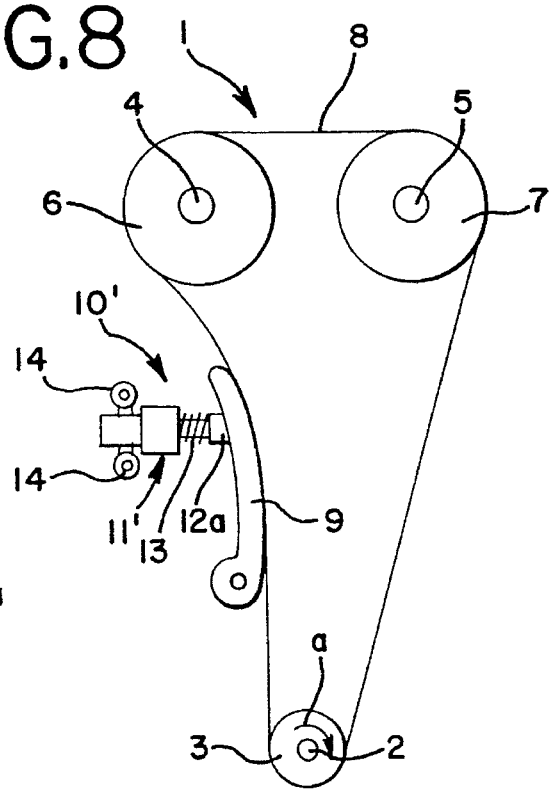

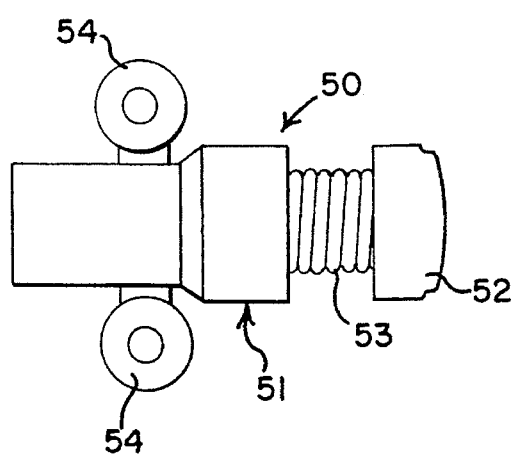
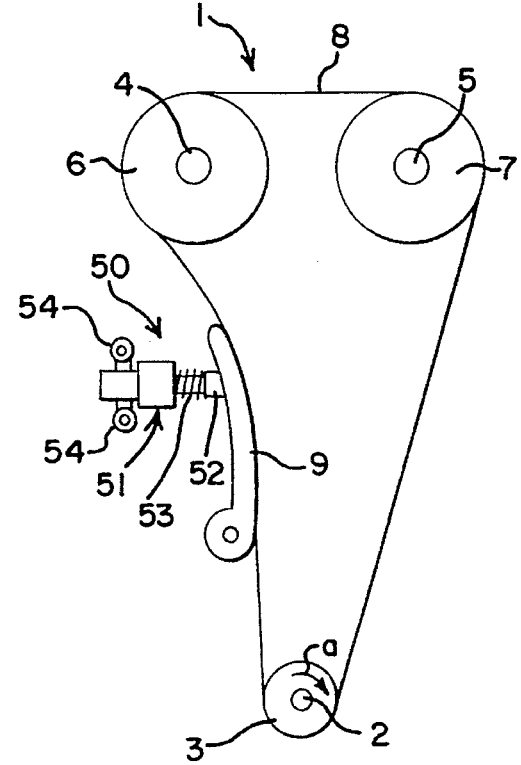
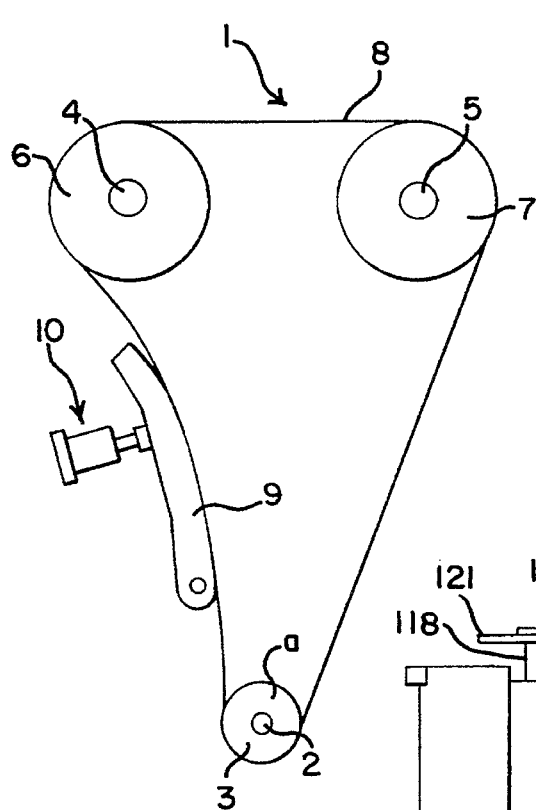
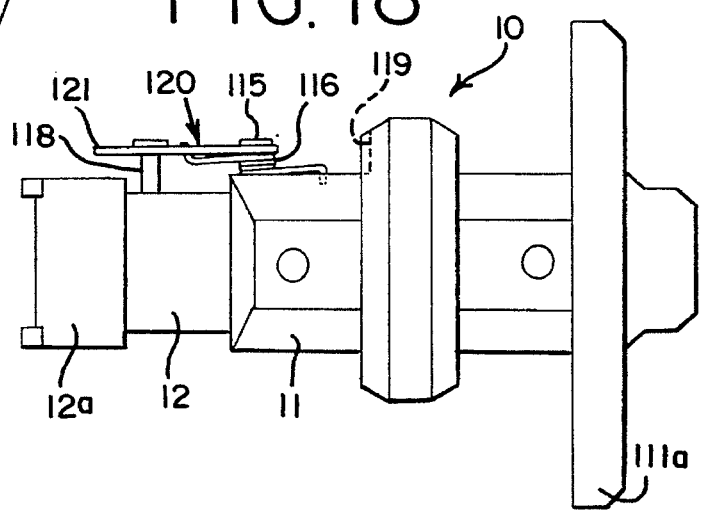

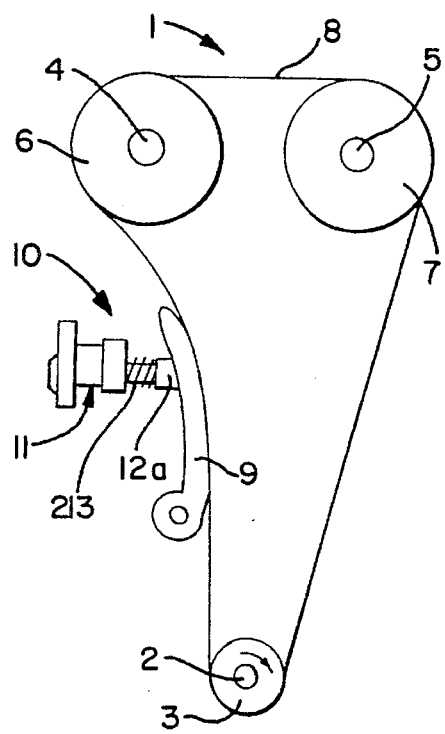
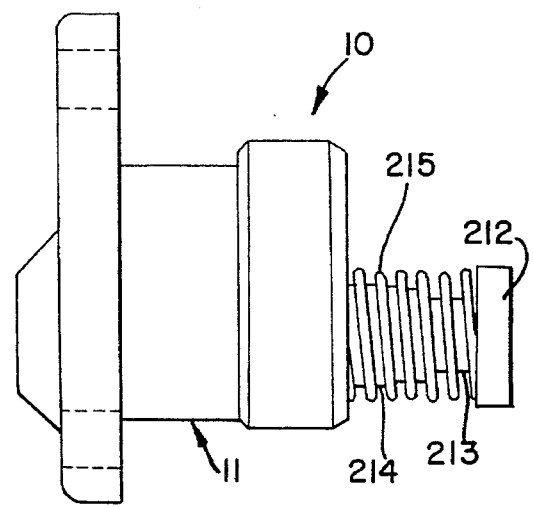
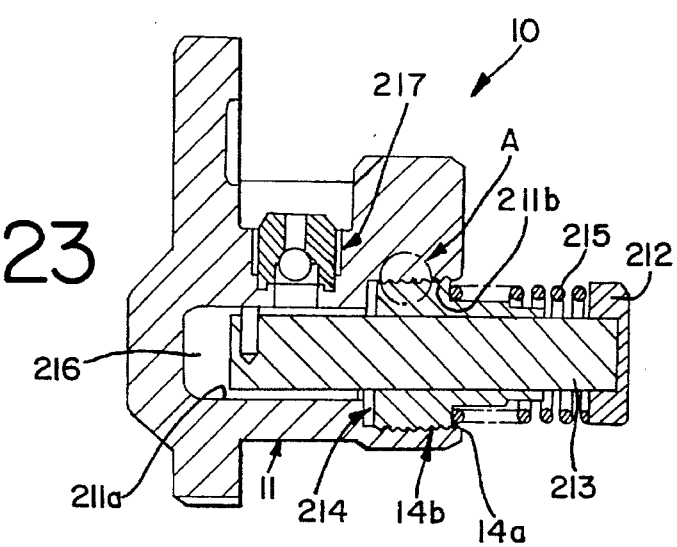
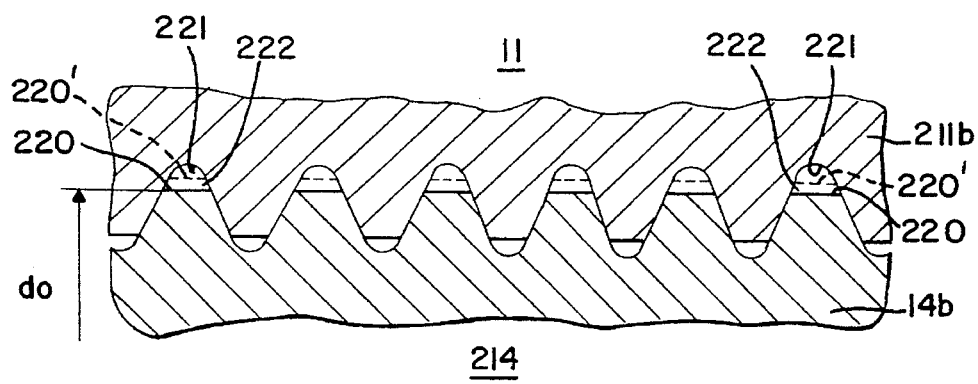

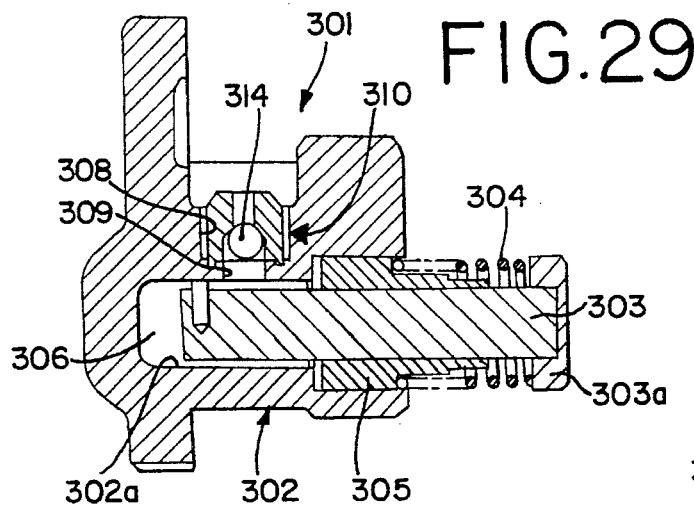
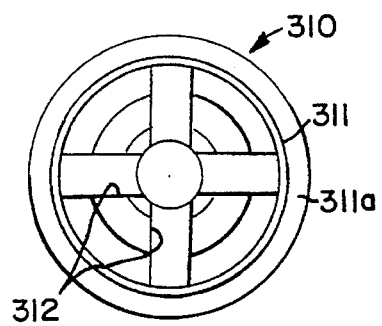
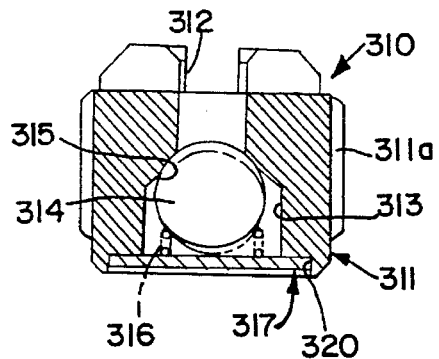
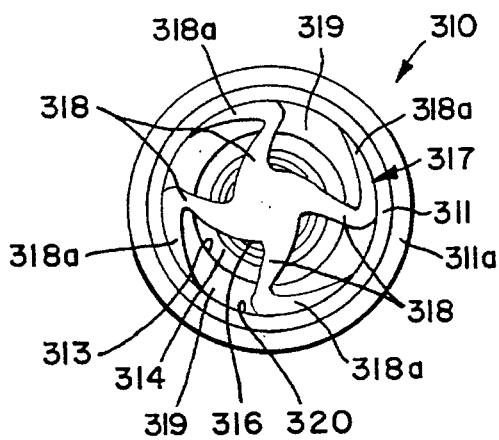
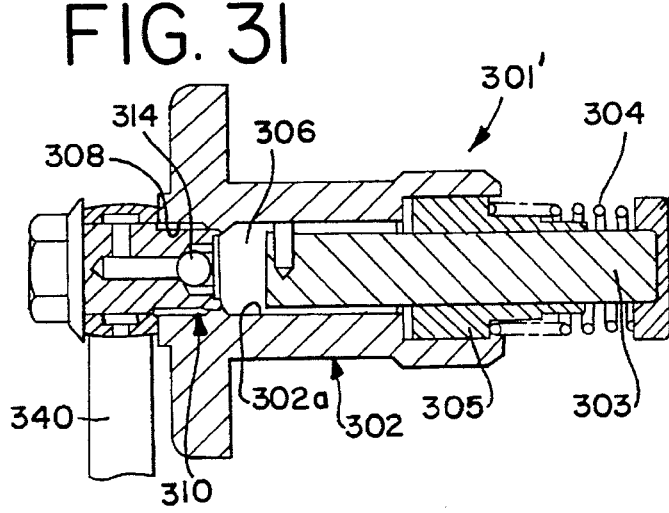

HYDRAULIC TENSIONER

BACKGROUND OF THE INVENTION

The present invention relates to a hydraulic tensioner. More particularly, the present invention, in several different embodiments, relates to a hydraulic tensioning device for maintaining the tension in a chain in an engine timing drive. The tensioner includes a piston or plunger member that extends outward from a housing or body and presses against a chain. The piston is forced outwardly from the housing by a spring located inside the piston. Oil is permitted to flow from a reservoir into the piston through a one-way check valve. Thus, the piston can extend to impart tension to the chain, but retracts slowly.

In one embodiment, the present invention relates to a tensioner that applies proper tension force to a chain or engine belt and, specifically, it relates to a tensioner with a stopper construction that can hold the plunger in the retracted position before assembly of the tensioner.

In general, a tensioner has a housing, a piston or plunger that slides within a cylindrical opening in the housing, and a coil spring that constantly pushes the plunger in the protruding direction. The end of the plunger presses against the tensioner arm due to the spring force of the coil spring.

A stopper member is utilized to hold the plunger in the retracted position before assembly in order to ease assembly of the tensioner to the engine. One end of this stopper member is rotatably supported by the housing and its other end is freely engageable with a stopper pin fixed to the plunger.

In several embodiments, the present invention is directed to a tensioner which is compact, and minimizes wear of the stopper member.

Hydraulic tensioners are also used conventionally for the suppression of fluttering of the chain or belt due to engine torque fluctuations and reduction of noise, vibration and wear of guides and other components.

Hydraulic tensioners are conventionally comprised of a hollow housing with an opening at one end and a hollow plunger with an opening on its rear end side. The plunger slides within the opening in the housing and a spring pushes the plunger in the outward direction by pressure-contacting its one end to the wall of the opening in the housing, and the other end to the wall of the opening in the hollow plunger, respectively. In addition, an oil chamber is formed by the opening in the housing and plunger. The tip of the plunger contacts the tensioner arm located on the slack side of the chain or belt.

During operation of such a hydraulic tensioner, the hydraulic pressure acts on the rear-end side of the plunger in the oil chamber, and the plunger pushes the chain or belt via the tensioner arm, based on mutual action of the hydraulic pressure and spring force. The plunger also receives a force in the reverse direction when the tension of the chain or belt increases during engine operation. During the time when insufficient oil is supplied to the oil chamber, such as immediately after engine starting, or the hydraulic pressure is insufficient in the oil chamber because of low engine rotation speed, the plunger backs up easily and proper tensioning force cannot be applied to the chain or belt.

Therefore, the spring force needs to be set to a higher value to maintain a proper tensioning force on the chain or belt by preventing the retraction of the plunger.

However, in the conventional hydraulic tensioner, the diameter of the plunger is increased because of installation of the spring within the hole of the hollow plunger, and the area of the plunger that receives pressure is large. Consequently, as mentioned above, the tensioning force due to the combination of hydraulic pressure and the spring force becomes unnecessarily high in the normal operation range of the engine when the spring force is set higher, and friction loss increases. As a result, wear increases on the tension arm, guide, and other components.

Therefore, in the conventional hydraulic tensioner, a ratchet mechanism is provided separately to prevent return of the plunger and the spring force is reduced to obtain smaller friction loss. As a result, the construction becomes complex and the cost also increases.

In a second embodiment, the present invention is directed to such problems and its purpose is to offer a hydraulic tensioner which can prevent retraction of the plunger and reduce friction loss with a simplified construction.

In yet another embodiment, the present invention relates to the so-called air vent mechanism for discharging air that mixes in the oil chamber of the housing to the outside of the housing.

In a conventional hydraulic tensioner, air can be mixed with the hydraulic oil in the oil chamber and, in such a case, the plunger retracts when a tension force is applied to the chain or belt due to the compression of the mixed-in air which is a compressible fluid. As a result, vibration occurs in the chain or belt.

Therefore, various air vent mechanisms have been proposed for the discharge of the mixed-in air in the oil chamber to the outside of the housing. A conventional air-vent mechanism, as shown in Japanese Patent Showa 46-28575, for example, uses a sintered filter of a sintered alloy, but dust in the air or sludge in the hydraulic oil can clog the pores of such a sintered filter, which makes air discharge unstable.

Therefore, an air-vent mechanism that discharges air through an air-venting part on the outer periphery where a helical groove is machined, as shown in Utility Model Showa 60-30507, has been proposed to eliminate such a problem. However, in such a case, a separate air-venting part is needed for venting the air, which increases the number of parts and makes the construction more complex.

In one embodiment, the present invention addresses such problems relating to air venting of the chamber.

In yet another embodiment, the present invention relates to a check-valve. Specifically, it relates to a check-valve which is attached from the outside to an opening formed in a housing of a hydraulic tensioner having a housing and an extendable/retractable plunger.

In conventional tensioners, an opening for the introduction of external hydraulic pressure is formed in the housing and a check-valve that regulates the flow of the hydraulic oil and allows it to flow into the oil chamber, but prevents reverse flow, is provided to the opening from the outside.

A conventional check-valve for a hydraulic tensioner 400, as shown in FIG. 32, for example, is comprised of body 403 attached to opening 402 formed in housing 401 of the hydraulic tensioner and ball 404 stored in body 403. Spring 405 has one end in pressure contact with ball 404 to keep ball 404 pressed constantly towards seat surface 406 by the force of spring 405. The other end of spring 405 is supported by bottom wall 407 of body 403. That is, bottom wall 407 acts as a retainer of spring 405. Also, small hole 408 leading to oil chamber of hydraulic tensioner 400 is formed in bottom wall 407.

In such a hydraulic tensioner with a check valve, a decrease in pressure in the oil chamber as a result of a shock or lessening of tension in the chain or belt causes ball 404 to lift from seat 406 and hydraulic oil is supplied to oil chamber through small hole 408. When a tensioning force is applied to the chain or belt and pressure in the oil chamber increases, the pressure is applied through small hole 408 to body 403 and, thereby, ball 404 contacts seat 406, and reverse flow of hydraulic oil is prevented.

In such a conventional check valve 400, hydraulic oil is introduced to oil chamber via small hole 408 formed in bottom wall 407 of body 403. Accordingly, flow resistance is large and sometimes hydraulic oil cannot be introduced smoothly to the oil chamber, and in such cases the response of the hydraulic tensioner decreases. Also, since body 403 is press-fit to opening 402 formed in housing 401, high accuracy machining of inner surface of opening 402 and outer surface body 403 is required, which increases the machining cost of the tensioner. In addition, check valve 100 can slip from opening 402 when pressure in the oil chamber becomes too high and overcomes the press-fitting.

In one embodiment, the present invention is directed to such problems, and its purpose is to offer a check valve for a hydraulic tensioner with which hydraulic oil can be introduced smoothly to the oil chamber of the hydraulic tensioner and slipping of the check valve can be prevented and assembly to the hydraulic tensioner is simplified.

SUMMARY OF THE INVENTION

In a first embodiment, the tensioner of the present invention has a freely extending/retracting plunger in a housing. A stopper sleeve is provided which allows rotation of the plunger and motion parallel to the rotation axis inside a cavity formed in the housing. The rear of the plunger is placed into the cavity. A stopper pin is attached to the rear end of the plunger protruding above its peripheral surface, which remains inside the housing.

The stopper sleeve has a first groove parallel to the axis direction, inside which the stopper pin can move. A second groove intersects the first groove, in which the stopper pin can engage with the sleeve when the plunger is in the retracted position. The tensioner of this embodiment has the stopper pin as a loosening-prevention pin to prevent disengagement of the plunger from the housing. The stopper sleeve rotates within the plunger hole, and the second groove is directed at an angle to the first groove and is in the direction toward the front end of the plunger. The stopper sleeve may also be fixed in the plunger hole.

In a first embodiment of the hydraulic tensioner of this invention, the stopper pin attached to the rear end of the plunger engages with the second groove formed in the stopper sleeve before assembly to the engine while the plunger is held in the retracted position. After completion of assembly to the engine, when engagement of the stopper pin with the second groove is released, the plunger moves in the axial direction and protrudes. The stopper pin can also move axially by being positioned in the first groove. Therefore, it does not interfere with the movement of the plunger.

In this case, the tensioner, as a whole, can be made smaller because the stopper sleeve that functions as a stopping member, is inserted in the plunger hole formed in the housing. Also, because the stopper sleeve is held inside the plunger hole, during pre- and post-assembly to the engine, the stopper sleeve does not interfere with other parts during engine operation and noise generation is prevented.

The loosening-prevention pin of the plunger is used as a stopper pin and, therefore, the number of parts is reduced, which contributes to cost reduction. Additionally, the assembly to the engine is performed with the plunger held in the retracted position by engaging the stopper pin with the second groove of the stopper sleeve.

In this case, during assembly to the engine, the tip of the plunger contacts the tensioner arm by pressure. The stopper pin contacts the inclined groove of the stopper sleeve when the tensioner is pushed a small distance and the stopper pin acts to rotate the stopper sleeve. At this time, the stopper sleeve rotates, forced by the stopper pin, since the stopper sleeve rotates within the plunger hole.

Because of this rotary movement of the stopper sleeve, the stopper pin moves from the second groove to the first groove. Thereby, engagement of the stopper pin with the stopper sleeve is released when assembly to the engine is completed. As a result, the plunger moves axially and protrudes into pressure contact with the tensioner arm.

As shown above, engagement of the stopper pin with the stopper sleeve is released automatically at the time of assembly to the engine. Therefore, the assembly is easier and more efficient. Additionally, the stopper sleeve is nonrotatably fixed in the plunger hole. Therefore, during release of engagement between the stopper pin and stopper sleeve, at the time of assembly to the engine, the stopper pin is moved from the second groove of the stopper sleeve to the first groove by a small amount of forceful rotation of the plunger. As a result, the plunger protrudes axially and into pressure contact with the tensioner arm.

In this case, the stopper sleeve can act to stop the rotation of the plunger before assembly to the engine because the stopper sleeve is fixed in the plunger hole nonrotatably. Thereby, positioning of the plunger to the tensioner arm becomes unnecessary for assembly to the engine.

In another embodiment, a support member of a decreased inner diameter is provided at the opening of the housing and the plunger is supported by the support member. Therefore, the diameter of the plunger can be made smaller than the inner diameter of the oil chamber. Thereby, the pressure-receiving area of the plunger can be made smaller and the force of hydraulic pressure acting on the plunger can be made smaller. Therefore, even when the spring force is set higher, the pushing force of a combination of the hydraulic pressure and the spring force can be kept at a certain limit or lower in the normal operating range of the engine.

The above is explained with the aid of FIG. 13. FIG. 13 shows the change in pushing force of the hydraulic pressure-spring force combination as a function of the engine rotation speed. In the figure, the broken line and the solid line correspond to the conventional and the present invention, respectively. K and K' show the spring forces of the initial setting of this invented mechanism and the conventional mechanism, respectively.

As shown above, the plunger diameter was made smaller and the pushing force of hydraulic pressure was lowered in this invention. Therefore, the gradient of the curve of the pushing force is lower than for the conventional mechanism in FIG. 13, and the degree of increase of the pushing force with increase of engine rotation speed (i.e., increase of hydraulic pressure) is lower. Consequently, even when spring force K, i.e., initial pushing force, is set higher than spring force K' of the conventional mechanism, the pushing force can be lower than the conventional mechanism in the normal operation range N of the engine so that the pushing force can be held at the level of a necessary minimum throughout all rotation speed ranges.

Thereby, the pushing force can be made higher than for the conventional mechanism in the rotation speed range S at or below idle speed by increasing the spring force while suppressing friction loss. As a result, retraction of the plunger can be prevented by a simple construction without use of the ratchet mechanism.

Also, in the conventional case, oil in the oil chamber leaks through the sliding surface of the plunger at the opening of the housing when the engine stops. But in this embodiment a support member of a smaller inner diameter is provided at the housing opening. Therefore, a space to store oil can be formed below the plunger, so that a part of the oil in the oil chamber can be stored in the space, even after stopping the engine.

Thereby, oil fills up the oil chamber in a short time after re-start of the engine, and the hydraulic pressure can act on the plunger immediately for improved response of the hydraulic tensioner. In addition, installation of an energizing member on the outer periphery of the plunger, between the support member and the contact part, makes the conventional hollow plunger unnecessary so that the capacity of the oil chamber can be smaller. Thereby, oil fills up the oil chamber in a short time after re-start of the engine and hydraulic pressure can act immediately on the plunger so that the response can be improved further, together with the effect of oil storage space.

An oil reservoir that connects to the oil chamber is also provided. Therefore, oil can be stored in the reservoir and supplied from the reservoir to the oil chamber to increase the hydraulic pressure in the oil chamber, and increase the tensioning force of the plunger.

Also, immediately after starting the engine, oil from the oil reservoir fills the oil chamber in a short time, which permits increased hydraulic pressure on the plunger. Therefore, retraction of the plunger can be prevented by simple construction without use of the ratchet mechanism.

A check valve is also provided between the oil reservoir and the oil chamber so that flow of oil in the oil chamber to the reservoir is blocked when a reverse force acts on the plunger, and retraction of the plunger is prevented. Also, oil from the oil reservoir can be supplied properly to the oil chamber during engine start-up.

In another embodiment of this invention, the stopper member engages with the stopper pin prior to assembly to the engine and the plunger is held at its retracted position. After completion of the assembly to the engine and when engagement between the stopper member and stopper pin is released, the stopper member is placed in the engagement-released position because of the torque provided by the energizing means. Thereby, free movement of the stopper member is suppressed by restricting the stopper member during engine operation for assured prevention of noise generation and wear or drop-off of the stopper member during engine operation.

The stopper member at the engagement-released position can engage with the engagement part provided to the housing. Therefore, after the assembly of the tensioner, the stopper member engages with the engagement part. At the same time, the engagement position is maintained by the torque due to the energizing means. Thereby, free movement of the stopper member is significantly suppressed and, as a result, noise generation and wear or risk of disengagement of the stopper member is minimized.

According to another embodiment of this invention, air which is mixed into the oil in the oil chamber is led to the opening through the clearance between the male thread on the outer periphery of the support part and the female thread on the inner periphery of the opening, which mates with the above male thread. Air is discharged outside of the housing.

That is, in this case, the support part that supports the plunger slidably is utilized as an air-venting part for discharging air. Therefore, a separate part for air discharge is not necessary so that the number of parts can be reduced and the construction can be made simpler.

At least one of either the outer diameter or the bottom diameter of the male thread formed on the outer periphery of the support part is smaller than the standard size. Therefore, the clearance between the peak of the thread of the male thread and the bottom of the female thread or the clearance between the bottom of the male thread and the peak of the female thread is larger than the clearance between the standard threads when the male thread of this support part is screwed onto the female thread at the opening of the housing. Therefore, a helical groove of a large cross-sectional area is formed over the entire thread, so that the air mixed into the oil in the oil chamber is discharged to the outside of the housing through this helical groove. As a result, the air mixed in the oil chamber can be discharged easily to the outside of the housing and air-discharge performance is improved.

At least one of either the inner diameter or the bottom diameter of the female thread formed on the inner periphery of the hole opening is larger than the standard size. Therefore, the clearance between the peak of the thread of the female thread and the bottom of the male thread, or the clearance between the bottom of the female thread and the peak of the male thread is larger than the clearance between the standard threads, when the female thread at the hole opening is mated with the male thread of the support part. Therefore, a helical groove of a large cross-sectional area is formed over the entire thread so that air mixed in the oil chamber is discharged to the outside of the housing through this helical groove. As a result, the air mixed in the oil chamber can be discharged to the outside of the housing easily, and air-discharge performance is improved.

In another embodiment, the check valve for a hydraulic tensioner of this invention is used in a hydraulic tensioner with a housing and a plunger inserted slidably inside that housing, and it is placed from the outside into the opening formed in the housing by mating the male thread on its outer surface with the female thread in the opening. The check valve has a nearly cylindrical body with the valve chamber inside storing the check ball. The coil spring presses the check ball onto the seat surface of the valve chamber. The stopper with multiple radially extending legs supports the spring, with the legs' tips being held by elastic deformation force inside the opening of the valve chamber. The check valve has a tool-engagement part for attachment of its body to the tensioner housing.

According to this embodiment, the openings between adjacent legs can be used as passages for hydraulic oil because the retainer has multiple legs. Thereby, a larger opening area is ensured compared to conventional small holes and, as a result, introduction of hydraulic oil to the oil chamber can be smooth.

Also, since the attachment of the check valve to the hydraulic tensioner is by mating the male thread formed on the outer surface of the body to the female thread formed at the housing opening, high machining accuracy for press fitting of the body into the housing opening is not required, which reduces machining costs. At the same time, due to the thread engagement, disengagement of the check-valve can be prevented.

Furthermore, due to the thread-engagement, the attachment to the hydraulic tensioner can be easy. In addition, in such a case, assembly of the check valve by using an attachment tool is easier because of the provision of a tool-engagement part.

BRIEF DESCRIPTION OF THE DRAWINGS

FIG. 5 is an illustration of the movement of the pin of the hydraulic tensioner during assembly to the engine.

FIG. 6 is an illustration of the movement of the pin of the hydraulic tensioner during assembly to the engine.

FIG. 7 is a side view of the hydraulic tensioner of another embodiment of this invention.

FIG. 8 is a side view of the hydraulic tensioner in a timing system.

FIG. 15 is a side view of the hydraulic tensioner of another example of this invention.

FIG. 16 is a side view of the hydraulic tensioner of FIG. 15 in a timing system.

FIG. 17 is one example of an engine timing system in which the tensioner of another embodiment of this invention is used.

FIG. 18 is a side view of the tensioner of FIG. 17 prior to assembly to the engine.

FIG. 21 is an automotive DOHC engine timing system in which a hydraulic tensioner of another embodiment of this invention is used.

FIG. 22 is a side view of the hydraulic tensioner of FIG. 21.

FIG. 23 is a side cross-section view of the hydraulic tensioner of FIG. 21.

FIG. 24 is an enlargement of part A of FIG. 23.

FIG. 29 is a side cross section of hydraulic tensioner in which check-valve of one embodiment of this invention used.

FIG. 30 is an enlargement of the check valve of FIG. 29 where (a) is a plan-view, (b) is a side cross section and (c) is a bottom view.

FIG. 31 is another embodiment of this invention.

FIG. 32 is a side cross section of a conventional check-valve.

DETAILED DESCRIPTION OF THE PRESENTLY PREFERRED EMBODIMENTS

Figure 1:
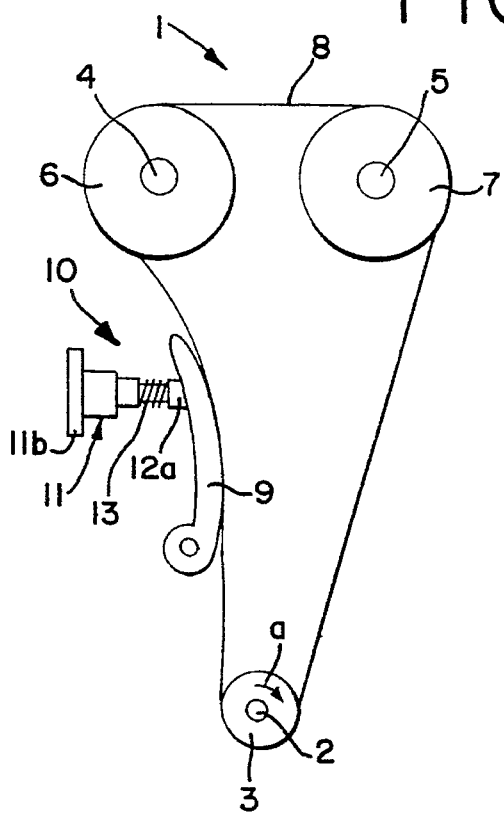
FIG. 1 is a side view of an example of an engine timing system in which one embodiment of the hydraulic tensioner of this invention is used.
Figure 2:
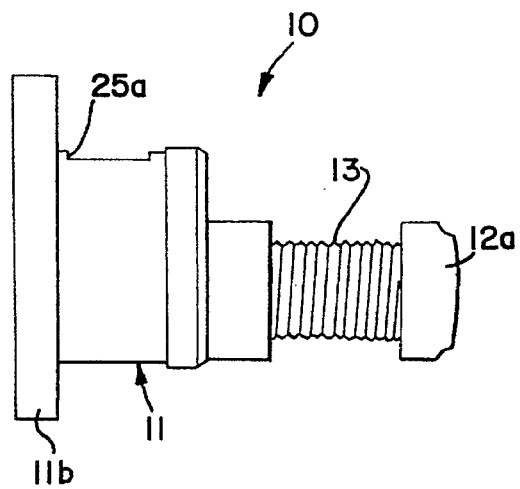
FIG. 2 is a side view of the hydraulic tensioner of FIG. 1.
Figure 3:
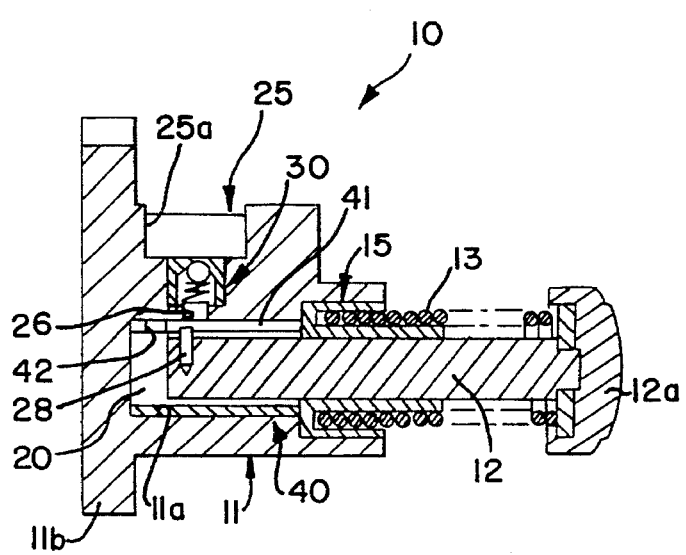
FIG. 3 is a cross-section of FIG. 2.
Figure 4A:
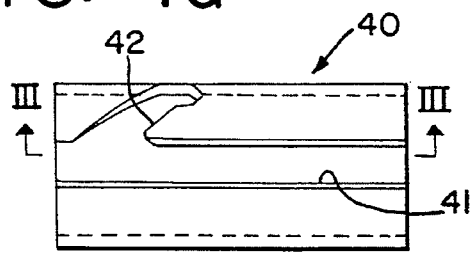
FIG. 4(a) is a plan view of a stopper sleeve inserted in the said hydraulic tensioner; (b) is its side view.
Figure 4B:
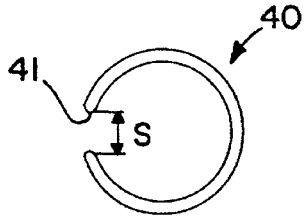

FIGS. 1–6 illustrate the hydraulic tensioner of a practical example of this invention, where FIG. 1 is a side view of one example of an engine timing system in which the hydraulic tensioner is used; FIG. 2 is a side view of a hydraulic tensioner; FIG. 3 is its cross-section; and FIG. 4 shows the stopper sleeve of the hydraulic tensioner where (a) is a plan view and (b) is its side view. Incidentally, section III—III of FIG. 4(a) is shown for the stopper sleeve of FIG. 3. FIGS. 5 and 6 illustrate the operation of the pin of the hydraulic tensioner.

FIG. 1 shows the DOHC engine timing system and this timing system 1 has drive sprocket 3 fixed to crankshaft 2, driven sprockets 6 and 7 fixed to 2 camshafts 4 and 5 and timing chain 8 placed across these sprockets. Arrow a in the figure indicates the direction of rotation of crankshaft 2.

Hydraulic tensioner 10 is located on the slack side of timing chain 8 to apply tensioning force to timing chain 8 via tensioner arm 9.

As shown in FIGS. 2 and 3, hydraulic tensioner 10 has housing 11 with a hole (plunger hole) 11a having an opening at one end. Plunger 12 has contact part 12a at its tip, that contacts tensioner arm 9, and coil spring 13 that pushes plunger 12 in the direction of protrusion.

Support member 15 that supports plunger 12 slidably and rotatably is pressed into the opening of hole 11a of housing 11. One end of coil spring 13 and its other end are in pressure contact with the end face of stopper member 15 and end face of contact part 12a, respectively.

Loosening-prevention pin 28, for preventing plunger 12 from disengagement from hole 11a, is inserted at the rear end of plunger 12 placed within hole 11a. The top end of pin 28 protrudes from the outer surface of plunger 12.

Stopper sleeve 40 is supported rotatably within hole 11a to allow sliding and rotation of plunger 12. Stopper sleeve 40 has cut-out 41 (first groove) parallel to the rotation axis, as shown in FIG. 4, and width s of this cut-out 41 is a little larger than the diameter of pin 28. Also, groove 42 (second groove) that intersects cut-out 41, is formed in stopper sleeve 40. The width of this groove 42 is approximately the same width as cut-out 41.

As shown in FIGS. 5 and 6, groove 42 intersects cut-out 41 on the rear-end side of stopper sleeve 40 (left end side in the figures). At the same time the groove composed of inclined groove 42a extends at an angle to cut-out 41 toward the front end of the plunger (the right side of the figures). Parallel groove 42b extends nearly parallel to cut-out 41 from the side end of the inclined groove 42a.

Before assembly of the hydraulic tensioner 10 to the engine, pin 28 of plunger 12 engages with the tip part of parallel groove 42b of stopper sleeve 40, thereby holding the plunger at its retracted position.

Also, oil chamber 20, partitioned by plunger 12 and support member 15, is formed in hole 11a and hydraulic pressure from an external hydraulic circuit (not shown), including an oil pump, is supplied into the oil chamber 20.

Oil reservoir 25 is provided at the top of housing 11 for collection and storing of splashing oil within the engine. Oil reservoir 25 is comprised of opened cavity 25a, formed on top of housing 11. Oil passage 26 connects oil reservoir 25 and oil chamber 20 via check valve 30.

Next, assembly of tensioner 10 to the engine is explained. Before assembly to the engine, plunger 12 is put in the retracted position where pin 28 engages with the tip part of parallel groove 42b of stopper sleeve 40 (see FIG. 5).

In this condition, tensioner 10 is attached to the engine from its side (on the left in FIG. 1). That is, tensioner 10 is put into a recess formed in the engine side wall and flange 11b is bolted onto the engine side wall for assembly of tensioner 10 to the engine.

During this assembly to the engine, contact part 12a at the tip of the plunger is pressed to tensioner arm 9 as the bolts are tightened, and plunger 12 retracts gradually (see the dash-dot line in FIG. 5). Thereby, pin 28 at the rear end of plunger 12 also moves toward the rear (on the left, same FIG.), and pin 28 moves into inclined groove 42a.

When the bolts are tightened further, plunger 12 retracts further and pin 28 moves into pressure contact with inclined groove 42a. Thereby, pin 28 acts to rotate stopper sleeve 40 in a direction where cut-out 41 moves upward in FIG. 5. At this time, since stopper sleeve 40 is supported rotatably in hole 11a, stopper sleeve 40 rotates because of a force exerted by pin 28.

Pin 28 moves gradually to the side of cut-out 41 from inclined groove 42a because of this rotary motion of stopper sleeve 40. Upon completion of bolt-fastening (i.e. completion of assembly to the engine), pin 28 enters into cut-out 41 and engagement between pin 28 and groove 42 is released (see the one-dot line in FIG. 6). Then, plunger 12 protrudes forward due of the spring force of coil spring 13 and it presses tensioner arm 9. Thus, the assembly is completed.

Incidentally, pin 28 moves along cut-out 41 when plunger 12 protrudes. Therefore, pin 28 does not interfere with the movement of plunger 12 (see solid line in the same figure).

In this case, the tensioner as a whole can be made smaller because stopper sleeve 40, that acts as a stopping member, is inserted in hole 11a formed in housing 11. Also, the stopper sleeve does not interfere with other parts during engine operation because stopper sleeve 40 is constantly inside hole 11a. Therefore the generation of noise is prevented.

At the same time, in this case, engagement between pin 28 and groove 42 of stopper sleeve 40 is released automatically at the time of assembly to the engine. Therefore, assembly is easy and work efficiency can be improved.

Also, the loosening-prevention pin of plunger 12 can be used as pin 28. Therefore a separate stopper pin is not necessary, so that the number of parts is reduced and this contributes to reduction of cost.

Incidentally, the practical example shows the rotatable support of stopper sleeve 40 in hole 11a of housing 11, but the application of this invention is not limited and this invention can also be applied similarly to the case where stopper sleeve 40 is fixed to hole 11a nonrotatably.

FIG. 7 shows an embodiment of a hydraulic tensioner having such fixed-type stopper sleeve. FIG. 8 shows a DOHC engine timing system in which the hydraulic tensioner is used. Incidentally, the same numbers as in the earlier embodiments indicate the same or equivalent parts in these figures.

Hydraulic tensioner 10' of FIG. 7 has nearly the same composition as hydraulic tensioner 10 of the above-described example, but leg member 14, in which a hole for bolt insertion is attached to housing 11' as the member for attachment to the engine, instead of the flange, which is different from hydraulic tensioner 10. That is, this hydraulic tensioner 10' is different from the earlier embodiment and it is of a type which is attached to the front of the engine (top of sheet surface in FIG. 8).

Hydraulic tensioner 10' is placed in the engine from its front direction and the bolts inserted in leg member 14 are tightened for attachment of hydraulic tensioner 10' to the engine. After completion of assembly to the engine, engagement of the pin with the groove of the stopper sleeve is released by a small forceful rotation of plunger 12 by a worker. Thereby, the pin moves into the cut-out of the stopper sleeve and, as a result, plunger 12 protrudes axially and provides pressure contact with tensioner arm 9.

In this embodiment, the stopper sleeve is fixed nonrotatably. Therefore, the stopper sleeve can function to prevent the rotation of plunger 12. Therefore, positioning of contact part 12a of plunger 12 to tensioner arm 9 becomes unnecessary, and, as a result, assembly is easier and work efficiency can be improved.

Also, this embodiment shows an application of this invention to the hydraulic tensioner, but this invention can be applied similarly to tensioners other than the hydraulic tensioner.

As shown above, the stopper sleeve that functions as the stopping member is inserted in the plunger hole formed in the housing of the tensioner of this invention. Therefore, not only is noise generation during engine operation prevented, but the tensioner can be made smaller.

Figure 9:
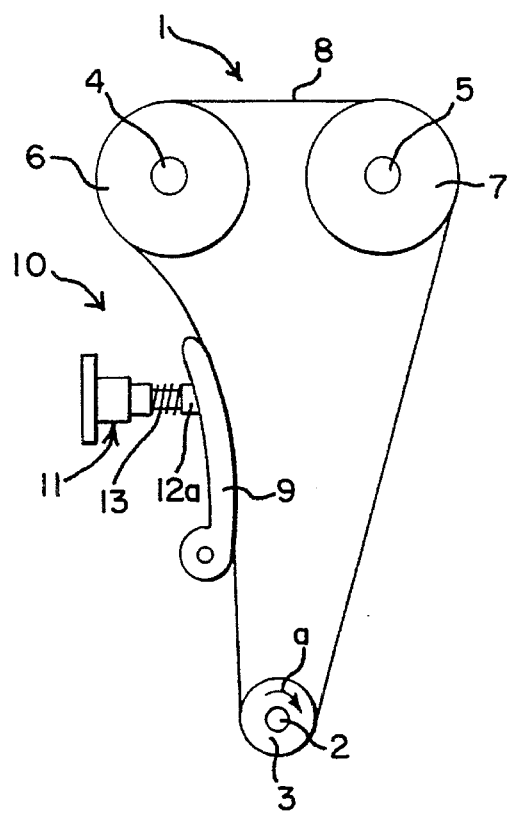
FIG. 9 shows a timing system with one embodiment of the tensioner of this invention.
Figure 10:
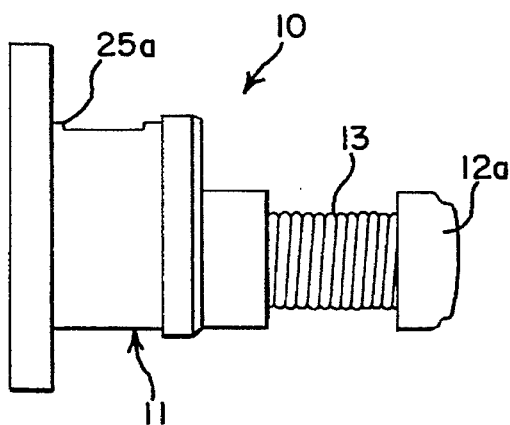
FIG. 10 is a side view of the tensioner of FIG. 9.
Figure 11:
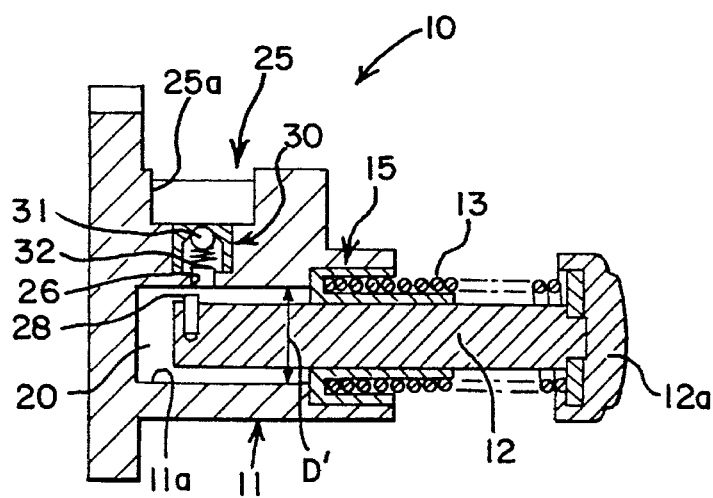
FIG. 11 is a cross-sectional view of the hydraulic tensioner of FIG. 9.
Figure 12:
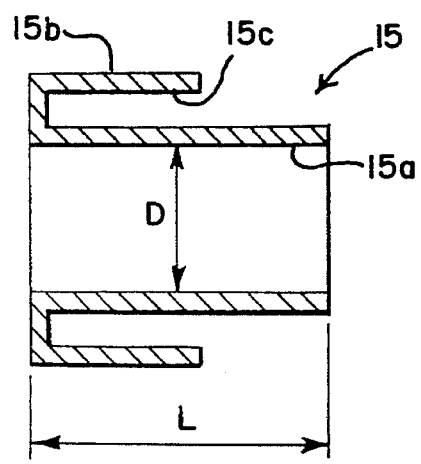
FIG. 12 is a partial enlargement of the support member of FIG. 11.
Figure 13:
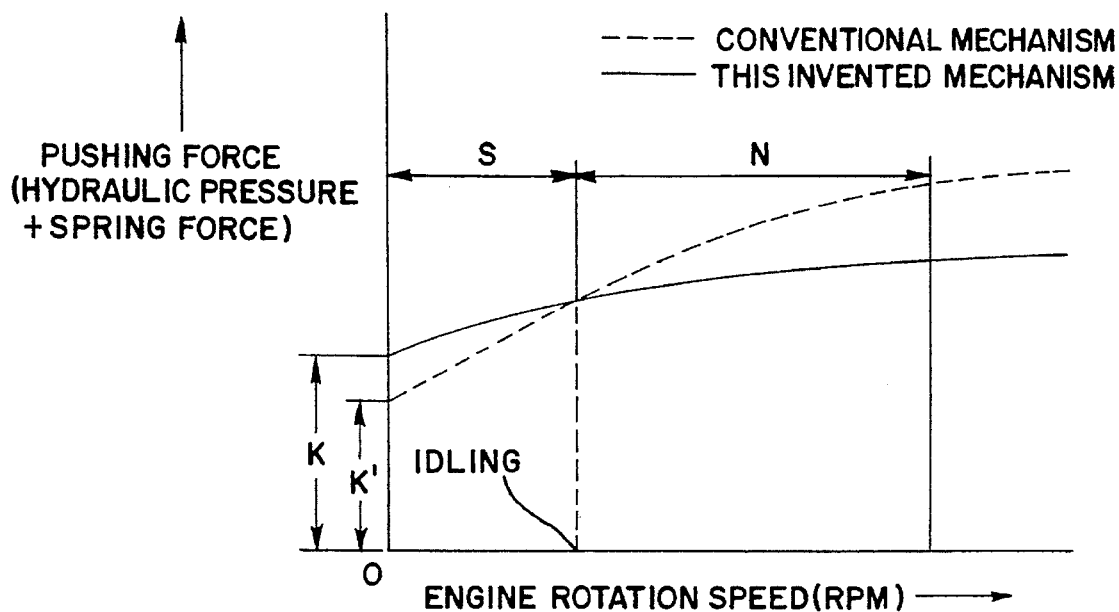
FIG. 13 is a comparison of the correlation between the pushing force of the hydraulic tensioner and the engine rotation speed with the conventional tensioner.
Figure 14:
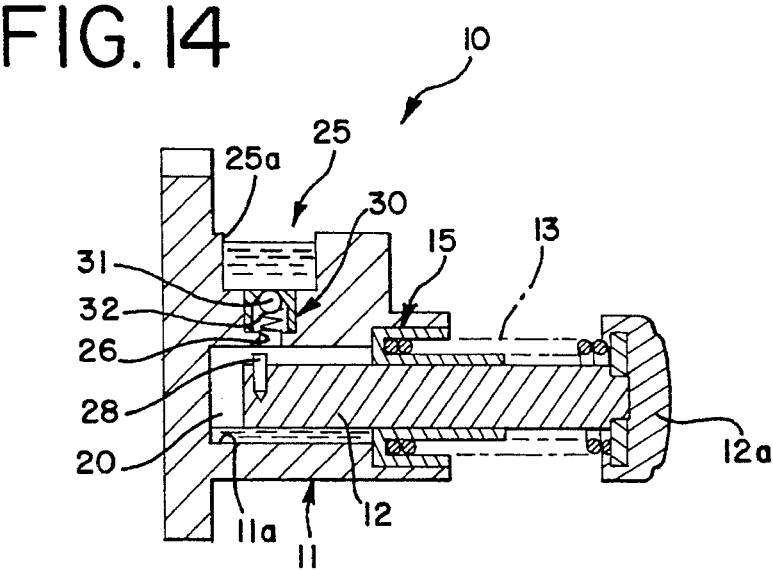
FIG. 14 is an illustration of the operation of the tensioner.

FIGS. 9–14 illustrate the hydraulic tensioner of another embodiment of this invention, where FIG. 9 shows one example of an engine timing system in which the hydraulic tensioner is used; FIG. 10 is a side view of the hydraulic tensioner; FIG. 11 is its cross-section; FIG. 12 is a partial enlargement of FIG. 11; FIG. 13 compares the correlation between pushing force of the hydraulic tensioner and engine rotation speed with a conventional tensioner; and FIG. 14 illustrates the function and effect of this embodiment.

FIG. 9 shows a DOHC engine timing system 1 which has drive sprocket 3 fixed to crankshaft 2. Driven sprockets 6 and 7 are fixed to two camshafts 4 and 5, respectively. Timing chain 8 is placed across these sprockets. Arrow a indicates the direction of rotation of crankshaft 2.

Hydraulic tensioner 10 is located on the slack side of timing chain 8 in order to have its tensioning force on timing chain 8 via tensioner arm 9.

As shown in FIGS. 10 and 11, hydraulic tensioner 10 has tensioner body (housing) 11, in which hole 11a has an opening at its one end. Piston rod (plunger) 12 is inserted into hole 11a and, at the same time, has contact part 12a that contacts tensioner arm 9 installed at its tip. Coil spring 13 pushes piston rod 12 in the protrusion direction.

Support member 15 is pressed into the hole opening of body 11. Support member 15 has the shape as shown in FIG. 12, where two cylinders of different diameters are located coaxially and one end of each is connected with the end of the other. Inner diameter D of inner circumference surface 15a is smaller than inner diameter D' of hole 11a of body 11. Piston rod 12 slides within inner circumference surface 15a of length L. Also, sleeve part 15c for holding part of coil spring 13 is formed between inner circumference surface 15a and outer circumference surface 15b. The ends of coil spring 13 contact the side wall of this sleeve and the support side of contact part 12a, respectively.

Oil chamber 20, which is defined by the inner walls of hole 11a, piston rod 12 and support member 15, is formed in hole 11a of body 11. The oil pressure from the external hydraulic circuit (not shown), including the oil pump, is supplied to this oil chamber 20.

Also, piston rod 12 is supported via support member 15, so that a space for storing of oil is formed below piston rod 12 in oil chamber 20. A part of the oil in oil chamber 20 can be stored in the space after the engine stops (see FIG. 14).

Oil reservoir 25, for the collection and storage of splashing oil in the engine, is provided on the top of body 11. Oil reservoir 25 is comprised of opened cylindrical cavity 25a formed on top of body 11. Oil passage 26 is formed between oil chamber 20 and oil reservoir 25 and the oil passage 26 is connected to oil reservoir 25 via check valve 30. Check valve 30 is comprised of ball 31 and spring 32 which pushes the ball onto the seat surface (upper side of FIG. 11). Loosening-prevention pin 28 is fixed to the rear end of piston rod 12.

In operation, oil from the external hydraulic circuit is supplied to oil chamber 20 during engine operation, and the combined pushing force of this hydraulic pressure and repulsive force of coil spring 13 acts on chain 8 through contact part 12a of piston rod 12 and tensioner arm 9. Also, splashing oil is stored in oil reservoir 25 (see FIG. 14) during operation of timing system 1.

In this case, as mentioned above, the diameter of piston rod 12 ($\approx D$) is smaller than hole diameter $D'$ because piston rod 12 is supported by support member 15. Therefore, the pressure-receiving area of piston rod 12 is small and the pushing force of the hydraulic pressure acting on piston rod 12 is also small.

Therefore, as illustrated in FIG. 13, the degree of increase of pushing force with increase of engine rotation speed (i.e. increase of hydraulic pressure) is low. Therefore, even if spring force K is set higher, the combined pushing force of the hydraulic pressure and spring force is held at a certain limit or lower in normal rotation speed range N of the engine and the pushing force is at its necessary minimum in all rotation speed ranges.

Thereby, friction loss is suppressed while the spring force can be set higher. As a result, retraction of the piston rod can be prevented by simple construction without use of a ratchet mechanism even when tension of the chain increases.

A part of the oil in oil chamber 20 is stored in a space for oil storage below piston rod 12 after stopping the engine (see FIG. 14). Thereby, oil fills up oil chamber 20 in a short time during re-start of the engine and the hydraulic pressure acts immediately on piston rod 12. As a result, retraction of piston rod 12 can be prevented by simple construction without use of a ratchet mechanism.

In this embodiment, chain 8 is pulled by drive sprocket 3 immediately after starting the engine (i.e. immediately after driving chain 8). Therefore, slack occurs on the slack side of chain 8 and piston rod 12 of hydraulic tensioner 10 protrudes slightly due to the spring force of coil spring 13.

Then, due to a pressure drop in oil chamber 20, the oil in oil reservoir 25 flows into oil chamber 20 via check valve 30. This oil mixes with the oil stored in the space for oil storage and oil chamber 20 is filled with oil immediately.

Also, installation of coil spring 13 on the outer periphery of piston rod 12 makes unnecessary the use of the conventional hollow member for the piston rod. Therefore, the capacity of oil chamber 20 can be smaller.

Accordingly, oil fills up oil chamber 20 in a short time after restart of the engine and the hydraulic pressure acts on piston rod 12 immediately, so that the response of hydraulic tensioner 10 can be further improved, together with the effect of the space for oil storage.

Additionally, check valve 30 can block leakage of oil in oil chamber 20 to oil reservoir 25 when the tension of chain 8 increases and a force acts on piston rod 12 in the retraction direction to prevent retraction of piston rod 12.

Also, piston rod 12 is supported by support member 15 so that piston rod 12, contact member 12a, coil spring 13 and support member 15 can be assembled as a small subassembly.

Thereby, for assembly of hydraulic tensioner 10, attachment of a subassembly to the opening of the body of a conventional hydraulic tensioner suffices when the opening of the body is machined for press fit of support member 15. Thereby, assembly becomes easier and the cost of assembly can be reduced.

Also, high-accuracy machining was required of all sliding parts of the tensioner body for the plunger for conventional mechanisms. In contrast, in this embodiment, machining of the press fit part for support member 15 is only necessary for tensioner body 11 while rough machining suffices for the press fit part. Therefore, machining costs can be reduced.

In addition, high-accuracy machining of the tensioner body itself was necessary for conventional mechanisms. Cast iron and other materials of good machinability and wear resistance were used for the body 11. In contrast, in this embodiment, such heavy material is not necessary, so that the overall weight can be reduced by the use of a lightweight aluminum die case.

Also, leak-down time of the oil had to be controlled for all sliding parts by the tensioner body for a plunger for conventional mechanisms. In contrast, in this embodiment, it can be controlled by inner diameter D and length L of support member 15, so that the control is easier.

While an example of an external hydraulic circuit separate from oil reservoir 25 was shown in the described embodiment, this oil reservoir 25 can be connected to the external hydraulic circuit.

Also, a type of attachment of the hydraulic tensioner from the side of the engine was shown in the described embodiment. This hydraulic tensioner can be applied to the attachment from the front of the engine, and the same results can be affected as in the described embodiment in such a case.

FIG. 15 shows such a hydraulic tensioner and FIG. 16 shows a DOHC engine timing system in which the hydraulic tensioner is used. The same numbers as in the drawings indicate the same or equivalent parts in FIG. 16.

In FIG. 15, hydraulic tensioner 50 has a tensioner body 51. A piston rod (not shown) is inserted in the body 51 and to which contact part 52 that contacts tensioner arm 9 (FIG. 16) is installed. Coil spring 53 pushes the piston rod in the protrusion direction. The piston rod slides within a support member (not shown), similar to that in the above-described embodiment. Also, leg members 54 with holes for bolt insertion for attachment of the hydraulic tensioner 50 to the cylinder block side of the engine are provided to the top and bottom of body 51.

As shown above, the hydraulic tensioner of this invention has a plunger supported by a support member with a small inner diameter. Therefore, the pressure-receiving area of the plunger can be made smaller and the pushing force of the hydraulic pressure acting on the plunger can be smaller. Thereby, the spring force can be increased while the friction loss can be minimized. As a result, retraction of the plunger can be prevented by simple construction without use of the ratchet mechanism.

Figure 19:
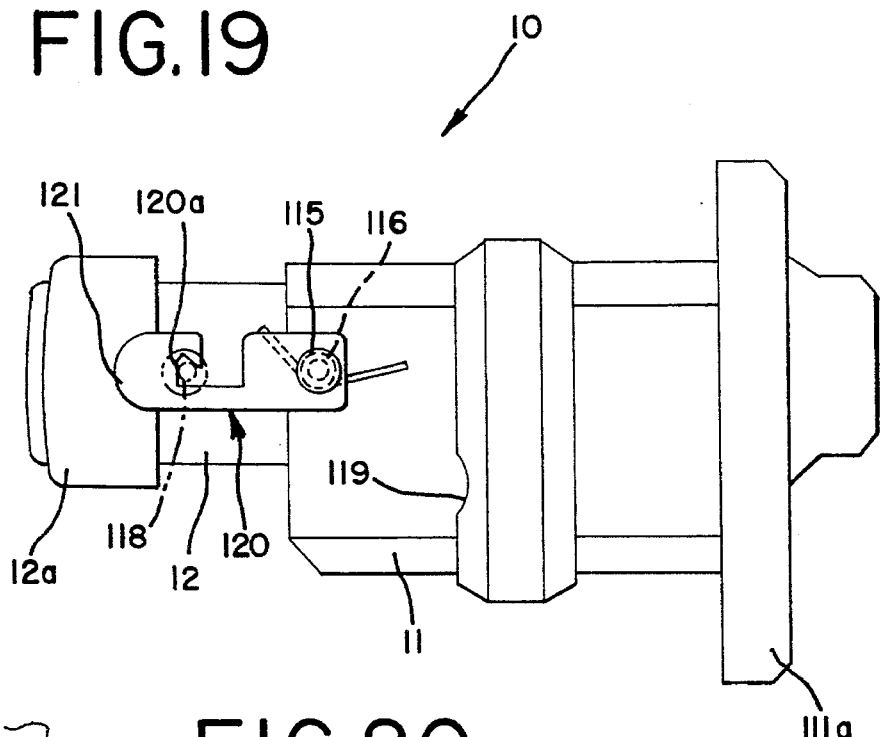
FIG. 19 is a plan view of the tensioner of FIG. 17 prior to assembly to the engine.
Figure 20:
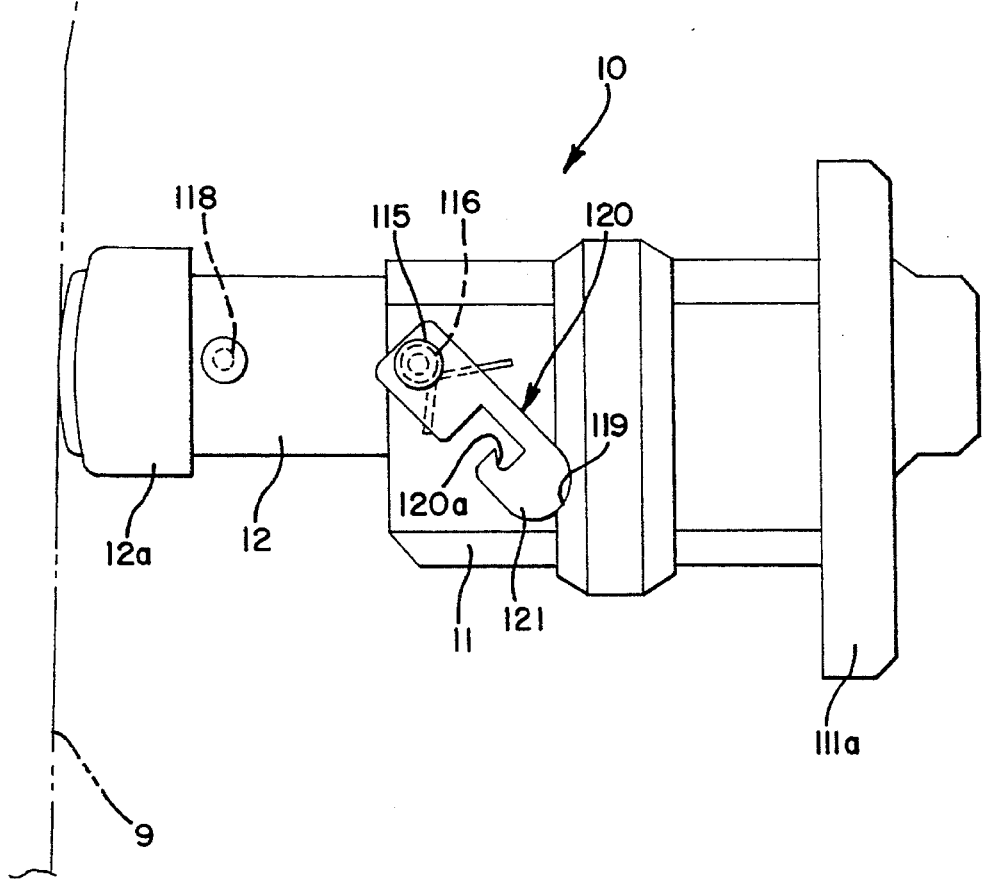
FIG. 20 is a plan view of the tensioner of FIG. 17 after assembly to the engine.

Additional examples of this invention are explained below with the aid of the attached FIGS. 17–20. FIGS. 17–20 explain the tensioner of one practical example of this invention, where FIG. 17 is an example of an engine timing system in which this practical example is used. FIG. 18 is a front view of the tensioner prior to its assembly to the engine. FIG. 19 is its plan view and FIG. 20 is a plan view after assembly of the tensioner to the engine.

FIG. 17 shows a DOHC engine's timing system, and this timing system 1 has drive sprocket 3 fixed to crankshaft 2, driven sprockets 6 and 7 fixed to two camshafts 4 and 5, respectively, and a timing chain 8, which is placed across these sprockets. Arrow a indicates the direction of rotation of crankshaft 2.

Hydraulic tensioner 10 is located on the slack side of timing chain 8 for application of the pushing force onto timing chain 8 via tensioner arm 9.

As shown in FIGS. 18 and 19, hydraulic tensioner 10 is comprised mainly of housing 11 and plunger 12, which slides within the housing. Flange 111a is formed on the rear-end side of housing 11 for assembly of hydraulic tensioner 10 to the engine. Contact part 12a that can contact the tensioner arm 9 is provided to the tip of plunger 12. Although not shown, a spring is stored in housing 11 for constant energizing of plunger 12 in the protrusion direction.

The bottom end of support shaft 115 is inserted in housing 11. One end of stopper member 120 is attached to support shaft 115 and stopper member 120 is rotatable around support shaft 115. Also, coil spring 116 is installed around support shaft 15 and the ends of the coil spring are fixed to housing 11 and stopper member 120, respectively. Thereby, at stopper member 120, a torque is constantly exerted due to the spring force of coil spring 116, in the counterclock-wise direction (left turn in FIG. 19) around support shaft 115.

Cut-out 120a is formed on the tip side of stopper member 120. The bottom end of stopper pin 118 is inserted in plunger 12 (see FIGS. 18 and 19). Stopper pin 118 is made to engage rigidly with cut-out 120a when plunger 12 is in the retracted condition prior to assembly of hydraulic tensioner 10.

Also, tip 121, in an arc shape, is formed at the tip of stopper member 120. Arc-shaped engagement-concave part 119, with which tip 121 can engage when stopper member 120 is at the engagement-released position, is formed on housing 11 (see FIG. 20).

Next, the assembly of tensioner 10 to the engine is explained. First, prior to the assembly to the engine, stopper pin 118 is engaged with cut-out 120a of stopper member 120 with plunger 12 at the retracted position (see FIGS. 18 and 19).

At this time, the spring force of coil spring 116, directed toward the engagement-released position, is acting on stopper member 120. However, the component of the force in the direction to disengage stopper pin 118 from cut-out 120a is not active because cut-out 120a, with which stopper member 120 engages, is formed at a sharp angle. As a result, stopper pin 118 tends not to disengage from cut-out 120a, even under vibration during transportation of tensioner 10.

Next, tensioner 10 is placed in a concave portion formed on the engine side wall and flange 111a is bolted onto the side wall for assembly of tensioner 10 to the engine. After completion of the assembly, contract part 12a at the plunger tip contacts tensioner arm 9 and plunger 12 retreats a small distance. Therefore, stopper pin 118 disengages from cut-out 120a of stopper member 120.

As a result, stopper member 120 rotates due to the spring force of coil spring 116 and is placed at the engagement-released position (see FIG. 20).

Thereby, free movement of stopper member 120 is suppressed by restricting stopper member 120 during engine operation. As a result, interference between stopper member 120 and other parts, and wear or potential disengagement of stopper member 120 during engine operation are minimized.

In addition, in this case, arc-shaped tip 121 of stopper member 120 at the engagement-released position is engaged with engagement concave part 119 of housing 11 and the engagement is maintained by the spring force of coil spring 116. Thereby, free movement of stopper member 120 is suppressed. As a result, noise generation, wear and potential disengagement of stopper member 120 during engine operation can be minimized.

Also, because stopper member 120 stops along the side wall of housing 11 at the engagement-released position, interference with other parts during engine operation does not occur. Therefore, freedom of component and engine design is increased.

Incidentally, in this embodiment, the case in which tip 121 of stopper member 120 engages with engagement concave part 119 of housing 11 was shown. But application of this invention is not limited to such a case. To the contrary, the engagement convex part can be provided to the side of housing 11 and the engagement concave part that engages with the engagement convex part can be provided on the side of stopper member 120.

In the tensioner of this invention, an energizing means to push the stopper member toward the engagement-released position is provided as described above. Therefore, the stopper member can be held at the engagement-released position by the torque exerted by the energizing means so that noise generation during engine operation is prevented and wear and potential disengagement of the stopper member can be minimized.

Additional examples of this invention are explained with the attached FIGS. 21–28. FIGS. 21–24 illustrate the hydraulic tensioner of a practical example of this invention where FIG. 21 shows an example of an engine timing system in which this hydraulic tensioner is used; FIG. 22 is a front view of this hydraulic tensioner; FIG. 23 is its cross-section and FIG. 24 is an enlargement of part A of FIG. 23.

FIG. 21 shows an automotive DOHC engine timing system 1 which has drive sprocket 3 fixed to crankshaft 2, driven sprockets 6 and 7 fixed to two camshafts 4 and 5, respectively and timing chain 8 placed across these sprockets. Hydraulic tensioner 10 is located on the slack side of timing chain 8 for application of a pushing force to timing chain 8 via tensioner arm 9.

As shown in FIGS. 22 and 23, hydraulic tensioner 10 has a housing 11, on one end of which hole 211a is formed with an opening. Plunger 213 is inserted in hole 211a. At the same time, contact part 212 which contacts tensioner arm 9, is attached to the plunger tip. Support part 214 supports plunger 213. Coil spring 215 pushes plunger 213 in the outward or protruding direction.

Oil chamber 216 is formed by the outer periphery of plunger 213, the inner wall of the hole 211a and the end face of support member 214. Hydraulic pressure from the external hydraulic source (not shown), including the oil pump, is applied to oil chamber 216 via check valve 217. Also, the tip and the rear end of coil spring 215 presses the back face of contact part 212 and end face 14a of support part 214, respectively.

Female thread 211b is formed on the inner surface of the hole opening of housing 11. Also, male thread 14b that mates with female thread 211b is formed on the outer surface of support part 14.

As shown in FIG. 24, peak 220 of each thread of male thread 14b is formed slightly lower than peak top 220' of standard size (here, the regular size corresponding to the inner diameter of female thread 211b). That is, outer diameter $d_o$ of male thread 14b is slightly smaller than the standard size.

Therefore, clearance 222 between peak 220 of each thread of male thread 14b and corresponding bottom 221 of female thread 211b is larger than that formed by the standard size outer diameter of male thread, and a helical groove of a large cross-sectional area is formed over the entirety of threads 211b and 14b.

In this composition, air mixed in as air bubbles in oil chamber 216 is led through the helical groove to the side of the opening of hole 211a and is discharged from the opening to the outside of the housing. Thereby, vibration of the plunger and vibration of the chain caused by mixed-in air can be prevented.

In this practical example, support part 214 that slidably supports plunger 213 is utilized as an air-extraction body for discharging air. Therefore, separate parts for air discharge are not necessary and the number of parts is reduced and construction can be simplified. Also, since the venting of air is by the use of a helical groove formed over the entire threads, mixed-in air in the oil chamber can be discharged easily to the outside of the housing and air-discharge performance is improved.

Furthermore, since attachment to the hole of the support part is by mating of threads, the high machining accuracy required for press-fitting of the support part to the hole is not required so that the cost of machining can be reduced. Also, in the case of press-fitting, the support part can disengage to the side of the hole opening when the pressure in the oil chamber is raised. The attachment by threads of this practical example can eliminate such a concern.

Figure 25:
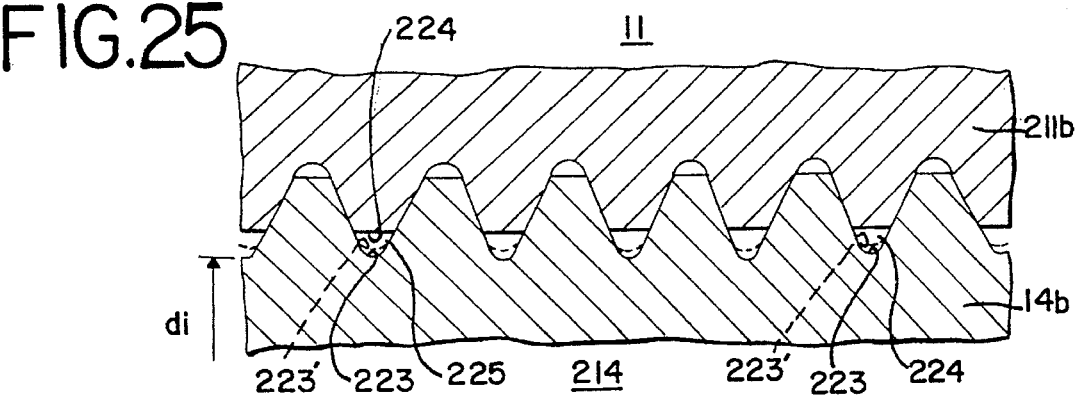
FIG. 25 is a first alternate embodiment of FIG. 24.

In a first alternate embodiment, shown in FIG. 25, outer diameter $d_o$ of male thread 14b is smaller than the standard size, to form a helical groove of a large cross-sectional area. Application of this invention is not limited to such a construction, and bottom diameter $d_i$ of male thread 14b can also be made smaller than the standard size, as shown in FIG. 25.

In FIG. 25, bottom 223 of each thread of male thread 14b is made slightly lower than bottom 223' of standard size (similar to the practical example, the regular size corresponding to the inner diameter of female thread 211b), and clearance 225 between bottom 223 of male thread 14b and corresponding peak 224 of female thread 211b is larger than that of the standard size bottom diameter of male thread 14b.

Thereby, similarly to the previous practical example, a helical groove of a large cross-sectional area is formed over the entire threads 211b and 14b so that the air mixed into the oil in oil chamber 216 is discharged easily to the outside of the housing through this helical groove.

The practical example and the first alternate embodiment show examples of bottom diameter $d_i$ or outer diameter $D_o$ of male thread 14b formed smaller than the standard sizes, but this invention is not limited to these. As shown in a second alternate embodiment in FIG. 26 and a third alternate embodiment in FIG. 27, inner diameter $D_o$ or bottom diameter $D_i$ of female thread 211b can be changed.

Figure 26:
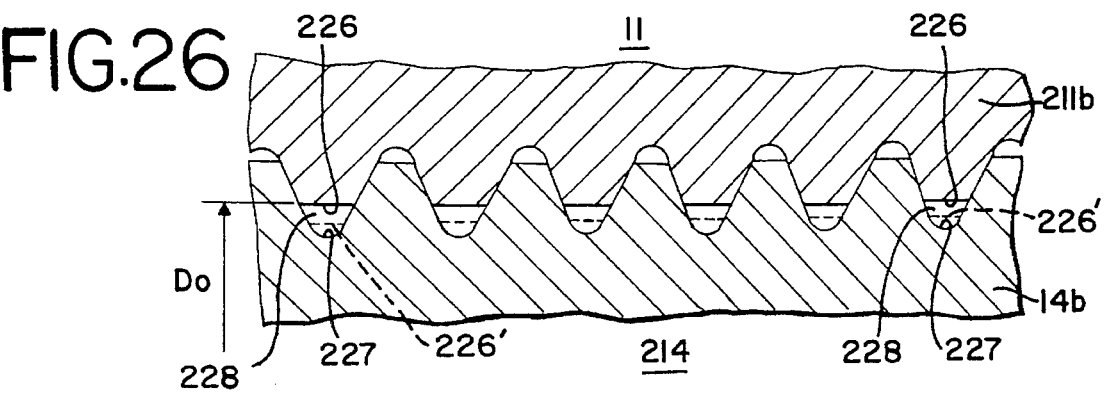
FIG. 26 is a second alternate embodiment of FIG. 24.

In FIG. 26, peak 226 of each thread of female thread 211b is formed slightly lower than peak 226' of the standard size (here, the regular size corresponds to the outer diameter of male thread 14b). That is, inner diameter $D_o$ of female thread 211b is slightly larger than the standard size. Thereby, clearance 228 between bottom 227 of male thread 14b and corresponding peak 226 of each thread of female thread 211b is made larger than that of the standard size inner diameter of female thread 211b. Similar to the first alternate embodiment, a helical groove of a large cross-sectional area is formed over the entire threads 211b and 14b.

Figure 27:
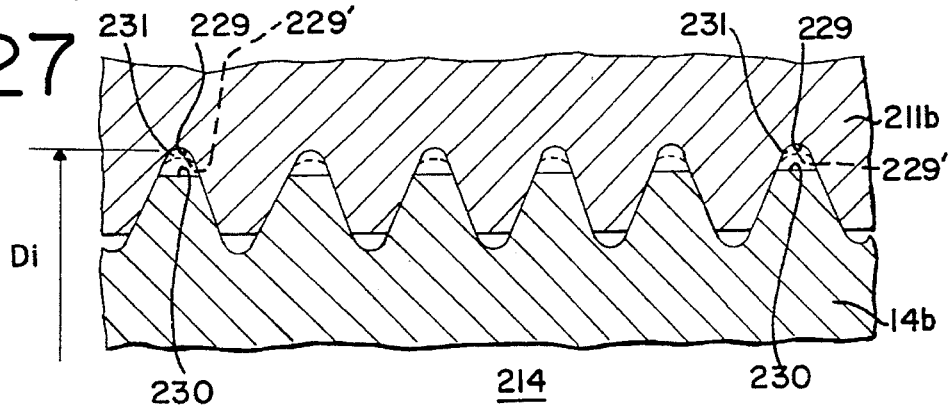
FIG. 27 is a third alternate embodiment of FIG. 24.

In FIG. 27, bottom 229 of female thread 211b is formed slightly looser than bottom 229' of the standard size (similar to the second alternate embodiment of FIG. 26, the regular size corresponding to the outer diameter of male thread 14b). That is, bottom diameter $D_i$ of female thread 211b is slightly larger than the standard size. Thereby, clearance 231 between bottom 229 of female thread 211b and corresponding peak 230 of male thread 14b is larger than that of the standard size bottom diameter of female thread 211b. Similar to the practical example, a helical groove of a large cross-sectional area is formed over the entire threads 211b and 14b.

Also, the practical example and the alternate embodiments can be combined optionally instead of a singular application. For example, the first alternate embodiment can be combined with the practical example and the second and third alternate embodiments can be combined. Also, at least one of either the second and third alternate embodiments can be combined with the practical example, or at least one of either the second and third alternate embodiments can be combined with the first alternate embodiment. In addition, all of the first to third alternate embodiments can be combined with the practical example.

Incidentally, in the alternate embodiments and the practical example, the diameter of female thread 211b or that of male thread 14b was modified, but this invention can also be applied to a case of the formation of both threads in the standard size without change of the diameter of the thread. In this case, too, a helical groove formed between the threads is utilized as an air vent.

The practical example and the alternate examples show a hydraulic tensioner that is applied to an automotive engine timing system, but this invention can be applied similarly to the timing system for motorcycles.

Figure 28:
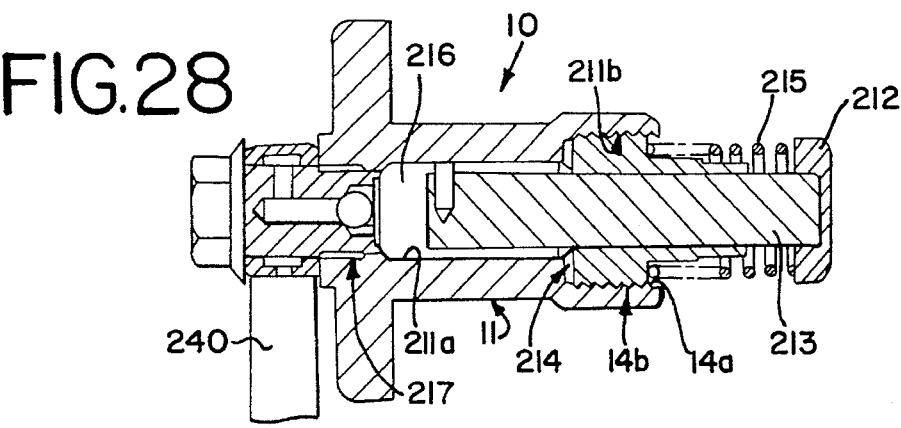
FIG. 28 is another alternate embodiment of the tensioner of this invention.

FIG. 28 shows an example of such a hydraulic tensioner and, in this figure, the same numerals as in FIG. 23 show the same or equivalent parts. Here, check valve 217 is located at the end of housing 11, which is different from the practical example. This composition allows easy connection to oil passage 240 from outside the engine.

As shown above, the hydraulic tensioner of this invention utilizes a support part that supports the plunger slidably as an air-venting part. Therefore, the number of parts can be reduced and construction can be simplified.

Additional examples of this invention are explained with attached FIGS. 29–32, below.

FIGS. 29 and 30 illustrate a check valve for a hydraulic tensioner of a practical example of this invention. FIG. 29 is a front cross section of the hydraulic tensioner in which this check valve is used, and FIG. 30 shows this check valve where (a) is a plan view, (b) is a front cross section and (c) is a bottom view.

In FIG. 29, hydraulic tensioner 30 has housing 302 in which hole 302a with an opening at one end is formed. At the same time, plunger 303, which is extendable/retractable in the outward or protrusion direction, is placed in the hole 302a. The rear end of oil spring 304 is in pressure contact with support member 305 which is press fit into the hole opening of housing 302.

Oil chamber 306 is defined by the inner wall of hole 302a, outer surface of plunger 303 and the end face of support member 305. Hydraulic pressure from an external hydraulic pressure circuit (not shown) including an oil pump is applied to this oil chamber 306 via check valve 310. Check valve 310 is attached to opening 308 made in housing 302 and oil passage 309 is formed between opening 308 and oil chamber 306.

Check valve 310 has a nearly cylindrical body 311 as shown in FIG. 30. Male thread 311a is formed on the outer surface of body 311. Male thread 311a is made to mate with female thread on the inner surface 308 of the opening (FIG. 29). Cross-shaped groove 312 with which Phillips head (or regular) screwdriver, i.e. an attachment tool can engage, is formed on the top of body 311. Incidentally, hexagonal hole for engagement of hexagonal wrench for engagement of a spanner can also be formed.

Valve chamber 313 is formed in body 311. Ball 314 (check-ball) is stored in valve chamber 313. Also, spring 316 that presses ball 314 towards seat 315 is located in valve chamber 313.

Stopper 317 that supports spring 316 is located at the opening of valve chamber 313. Stopper 317 has multiple legs 318 (4 legs here) that extend radially. Opening 319 is formed between adjacent legs 318. Also, tip 318a of each leg 318 deforms inside (toward the center) during installation of the stopper. At the same time, it is in pressure contact with the inner surface 320 of the opening of the valve chamber in the circumferential direction for elastic retention.

As shown above, elastic holding of stopper 317 in the circumferential direction prevents stopper 317 from deformation in its thickness direction as a Belleville spring. A dimension equivalent to the plate thickness of stopper is sufficient for attachment of stopper 317. Thereby, the length of the check valve in the axial direction (up/down direction in FIG. 30(b)) can be minimized and the check valve can be made compact.

The effect and function of this practical example is explained next. When slack in the chain or belt, on which the pushing force of plunger 303 of hydraulic tensioner 301 is acting, occurs, plunger 303 protrudes a small distance due to the spring force of coil spring 304. As a result, pressure in oil chamber 302a decreases. Then ball 314 lifts from seat 315 in check valve 310 (see dash-dot line in FIG. 30(b)) and hydraulic oil is introduced into body 311 from outside. Introduced hydraulic oil passes through openings 319 between legs 318 of stopper 317 and is introduced to oil chamber 302a via oil passage 309 of housing 302.

Conversely, when tension-force is applied to the chain or belt, plunger 303 tries to retract against the spring force of coil spring 304. As a result, the pressure in oil chamber 302a increases. Then, this pressure increase is transmitted into body 311 via opening of stopper 317. Thereby, ball 314 contacts seat 315 and reverse-flow of hydraulic oil is prevented.

As shown above, retainer 317 has multiple legs 318 in this practical example. Therefore, each opening 319 between adjacent legs 318 can be used as a passage for hydraulic oil. This ensures a large passage area, and, as a result, introduction of hydraulic oil into oil chamber 302a becomes smooth and the response of hydraulic tensioner 301 is improved.

Also, the assembly to hydraulic tensioner 301 is through thread engagement of male thread 311a formed on outer circumference of body 311 with female thread formed in housing opening 308. Thus, high machining accuracy is not required, and machining cost can be reduced. At the same time, possible disengagement of check valve 310 from opening 308 can be prevented because of the thread engagement.

In addition, assembly to hydraulic tensioner 301 becomes easy because of thread engagement. In such a case, assembly of check valve 310 becomes easier by the use of a screwdriver because groove 312 for screwdriver engagement is provided.

An application of this invention to an automotive engine timing-system is shown in the practical example. This invention can also be applied similarly to a hydraulic tensioner used in the timing system of a motorcycle engine.

FIG. 31 shows an example of such a hydraulic tensioner and in the figure the same codes as in FIG. 29 indicate the same or equivalent parts. In this hydraulic tensioner 301', check valve 310 is located on the end side of housing 302, which is different from the previous practical example. And, in this composition, connection to oil passage 340 from outside of the engine is also made easy.

As shown above, the check valve for the hydraulic tensioner of this invention has multiple legs. Therefore, openings between adjacent legs can be used as the passage of hydraulic oil so that large opening area can be ensured for smooth introduction of hydraulic oil to the oil chamber. Also, because the assembly to the hydraulic tensioner is through the thread engagement of male-thread of the outer surface of the body with the female thread at the housing opening, machining cost can be reduced and disengaged of the check valve from the hydraulic tensioner can be prevented. In addition, because of provision of the tool-engagement part, the assembly of the check valve can be easier.

What is claimed is:

1. A hydraulic chain tensioner comprising:
   a housing having an opening forming a fluid filled chamber;
   a plunger slidably received within said fluid chamber;
   a spring positioned at the rear end of said plunger, said spring biasing the plunger in a protruding direction from a retracted position in the chamber;
   a passage in said housing allowing fluid communication from an external source of pressurized fluid to said chamber;
   a check valve provided between said external source of pressurized fluid and said chamber, said check valve permitting passage of fluid into said chamber and restricting passage of fluid out of said chamber;
   a stopper sleeve connected to the housing, said stopper sleeve being positioned to permit axial and rotational movement of said plunger within said sleeve;
   a stopper pin attached to the rear end of said plunger and protruding above the outer surface of said plunger; said stopper sleeve having a first groove parallel to the axis of said plunger, said stopper pin being positioned for movement within said first groove, said stopper sleeve having a second groove intersecting said first groove, said stopper pin engaging said sleeve in said second groove to retain said plunger in said retracted position.

2. The tensioner of claim 1 wherein said stopper pin includes a pin member positioned to prevent disengagement of said plunger from said housing.

3. The tensioner of claim 1 wherein said second groove is directed at an angle to said first groove, said second groove extending in a direction toward the front end of said plunger.

4. The tensioner of claim 1 wherein said stopper sleeve is fixed in said housing opening.

5. A hydraulic chain tensioner comprising:

a housing having an opening forming a fluid filled chamber;

a plunger slidably received within said fluid chamber;

a spring positioned at the rear end of said plunger, said spring biasing the plunger in a protruding direction from a retracted position in the chamber;

a passage in said housing allowing fluid communication from an external source of pressurized fluid to said chamber;

a check valve provided between said external source of pressurized fluid and said chamber, said check valve permitting passage of fluid into said chamber and restricting passage of fluid out of said chamber;

a first stopper member located along the length of said plunger; a second stopper member attached to said housing; said first and second stopper members being mutually engageable to restrict movement of said plunger with respect to said housing when said plunger is in the fully retracted position within said opening.

6. The tensioner of claim 5 wherein said first stopper member further comprises a pin and said second stopper member further comprises a rotatable hook member, said hook member engaging said pin member to prevent movement of said plunger.

7. The tensioner of claim 5 wherein said second stopper member is spring biased in a released position when said first and second stopper members are not engaged.

8. A hydraulic chain tensioner comprising:

a housing having an opening forming a fluid filled chamber;

a plunger slidably received within said chamber;

a passage in said housing allowing fluid communication from a source of pressurized fluid to said chamber;

a check valve provided between said source of pressurized fluid and said chamber, said check valve permitting passage of fluid into said chamber and restricting passage of fluid out of said chamber;

a support member positioned within said chamber, said support member having an opening with an inner diameter that is smaller than the inner diameter of said chamber, said plunger being positioned within said support member in said chamber, a spring positioned around the outside periphery of said plunger and engaging said support member, said spring biasing the plunger in a protruding direction from a retracted position in the chamber.

9. The hydraulic tensioner of claim 8 wherein said housing includes an oil reservoir for storage of pressurized fluid from said pressurized fluid source.

10. A hydraulic chain tensioner comprising:

a housing having an opening forming a fluid filled chamber;

a plunger slidably received within said fluid chamber;

a spring positioned at the rear end of said plunger, said spring biasing the plunger in a protruding direction from a retracted position in the chamber;

a passage in said housing allowing fluid communication from an external source of pressurized fluid to said chamber;

a check valve provided between said external source of pressurized fluid and said chamber, said check valve permitting passage of fluid into said chamber and restricting passage of fluid out of said chamber;

a support member positioned within said chamber, said support member having an opening with an inner diameter that is smaller than the inner diameter of said chamber, said plunger being positioned within said support member in said chamber, said support member having a male thread formed on the outer periphery thereof, said male thread engaging a female thread formed on the inner surface of said opening.

11. A hydraulic chain tensioner comprising:

a housing having an opening forming a fluid filled chamber;

a plunger slidably received within said fluid chamber;

a spring positioned at the rear end of said plunger, said spring biasing the plunger in a protruding direction from a retracted position in the chamber;

a passage in said housing allowing fluid communication from an external source of pressurized fluid to said chamber;

a check valve provided between said external source of pressurized fluid and said chamber, said check valve permitting passage of fluid into said chamber and restricting passage of fluid out of said chamber, said check valve having a male thread formed on the outer surface thereof, said male thread engaging a female thread formed on the inner surface of said opening, said check valve including a retainer member located therein having a plurality of radially extending legs.

* * * * *